United States Patent [19]

Marks

[11] Patent Number: 4,969,248

[45] Date of Patent: Nov. 13, 1990

[54] METHOD FOR REMOVAL OF A RAIL CONNECTOR

[76] Inventor: Thomas Marks, 79-10 34th Ave., Jackson Heights, N.Y. 11372

[21] Appl. No.: 248,426

[22] Filed: Sep. 23, 1988

Related U.S. Application Data

[62] Division of Ser. No. 931,196, Nov. 14, 1986, Pat. No. 4,815,188.

[51] Int. Cl.[5] .............................................. B23P 19/04

[52] U.S. Cl. ...................................... 29/426.5; 29/259

[58] Field of Search .......... 29/249, 259, 260, 256–258, 29/261–266, 426.1, 426.5

[56] References Cited

U.S. PATENT DOCUMENTS

| | | | |
|---|---|---|---|
| 131,050 | 9/1872 | Butler | 29/259 X |
| 4,570,319 | 2/1986 | Showorodko | 29/259 |

*Primary Examiner*—Timothy V. Eley

*Attorney, Agent, or Firm*—Roberts, Spiecens and Cohen

[57] ABSTRACT

A method for extracting a connector secured in a rail comprising a body member having a chamber for receiving the body of the connector to be extracted and an actuator coupled to the body member and including a bolt which is externally operated for applying force to a shoulder portion of the connector and counter bearing force to the rail to axially extract the connector from the rail.

4 Claims, 2 Drawing Sheets

METHOD FOR REMOVAL OF A RAIL CONNECTOR

This is a divisional on application Ser. No. 931,196 filed Nov. 14, 1986, now U.S. Pat. No. 4,815,188.

FIELD OF THE INVENTION

The invention relates to a for removal of a rail connector used in railroad and subway systems.

PRIOR ART

Rail connectors are known which serve as sensors and are driven into holes in a rail and connected in circuit with a relay to signal the passage of the train. Additionally, in the New York City subway system, rail connectors are used at rail joints to form a continuous circuit and avoid the need for welds at the joints which would otherwise provide electrical connections.

In a typical arrangement where the rail connectors are intended to signal passage of a train, rail connectors are secured in the rails of the track and are connected to a power source and a relay such that when a train passes on the rails it completes a circuit which triggers the relay and produces a signal to indicate passage of the train.

Essentially, the rail connector comprises a member of solid conductive material which is fitted into a hole in the rail and which is connected to a cable which extends to the relay or to a connector in an adjacent rail section.

In order to remove the rail connectors, they must be forceably pulled from the hole in which they have been installed and this sometimes is difficult, especially after a period of time in which the connectors may become frozen in place. Also, since the rail may be placed adjacent to the third rail which carries electrical power, the removal of the connector requires a certain amount of care by the workmen. If the connector cannot be removed, it may become necessary to disable the connector and drill a new hole in the rail and install a new connector.

All the above represent difficulties and show the need for a method for removal of a rail connector.

SUMMARY OF THE INVENTION

An object of the invention is to provide a device of simple construction by which a connector can be easily and rapidly removed from a rail. In accordance with the invention, an extractor device is used for extracting the connector comprising a body member having a chamber for receiving the body of the connector to be removed from the rail and an actuator means coupled to the body member and externally operated for applying via said body member, force to a shoulder of the connector and counter bearing force to the rail to axially extract the connector from the rail.

In accordance with a feature of the invention, the actuator means comprises a head which is axially slidable on the body member and bolt means threadably connecting the head and body member for developing the extraction and counter bearing forces.

In accordance with a feature of the invention, the body member has a laterally open chamber into which the connector is received and a support surface of the body member serves as a seat for the shoulder portion of the connector.

In order to provide for rotatable adjustment of the position of the body member on the connector, the support chamber has laterally flared side surfaces which widen outwardly.

The actuator means comprises a pair of pins disposed on opposite sides of the chamber which are slidable in bores in the body member. The bolt means comprises a bolt loosely rotatable in the head of the actuator means and threadably engaged in the body member.

In accordance with a further feature of the invention, the bolt and pins have axes disposed in a common plane and the connector is seated in the support chamber so that the axis of the connector is also disposed in the common plane.

Another object of the invention is to provide a method of removing a connector from a rail by developing substantial forces with relatively little effort.

The method of the invention comprises the steps of fitting the body of the connector in a receiving chamber of an extractor device with a shoulder of the connector bearing against a supporting surface of the extractor device and applying extraction force to the connector at its shoulder while applying counter bearing force to the rail by the extractor device.

The application of the extraction force and the counter bearing force is developed by turning a bolt which is threaded in the extractor device.

The method of the invention comtemplates disposing the extraction force and the counter bearing force in a common plane and the forces are substantially equal and act in opposite directions.

DETAILED DESCRIPTION OF THE PREFERRED EMBODIMENT

Figure 3:
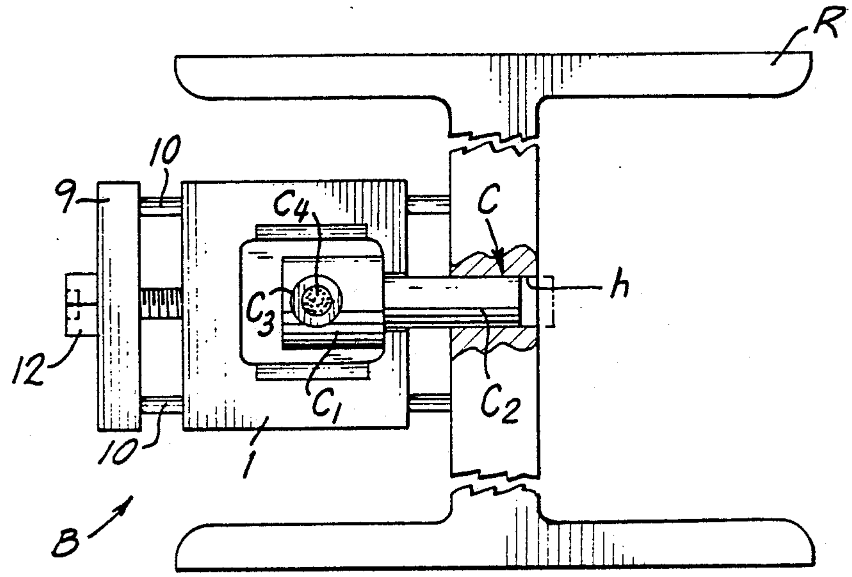
FIG. 3 is an elevational view which shows the device mounted on a rail in position to remove the connector.
Figure 4:
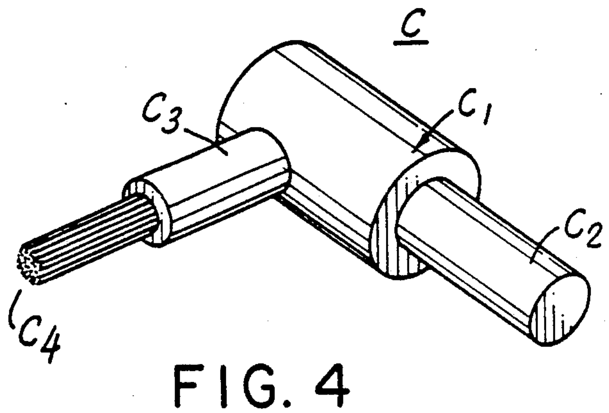
FIG. 4 is a perspective view showing the connector itself.

Referring to FIG. 4, therein is seen a rail connector C of general usage which comprises a solid metal conductive body $C_1$ with a projecting pin $C_2$. The pin $C_2$ is intended for being tightly inserted into a hole h in a rail R as seen in FIG. 3. An integral portion $C_3$ extends from the body $C_1$ and contains a cable $C_4$ which is adapted for connection in a power circuit containing a relay. When a train passes on the rail, it closes the circuit which causes the relay to be energized to produce a signal to indicate passage of the train on the tracks at the location of the connector.

As evident in FIG. 3, the connector C is installed in the hole in the rail in a position in which the portion $C_3$ extends, generally, longitudinally of the rail and the cable $C_4$ extends to the circuit connection.

Up to this point, the construction is conventional and the invention is directed to a method and device by which the removal of the connector C can be easily and rapidly effected, even though the connector may be frozen or tightly impacted in the hole in the rail.

Figure 1:
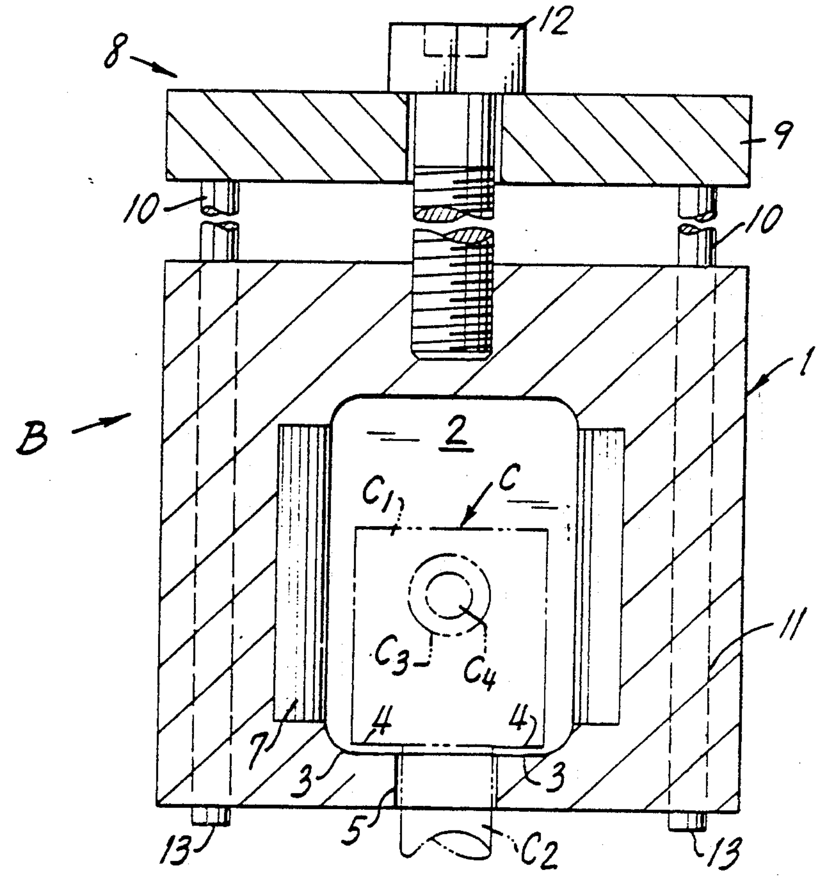
FIG. 1 is a front sectional view of one embodiment of a device for carrying out the method according to the invention.
Figure 2:
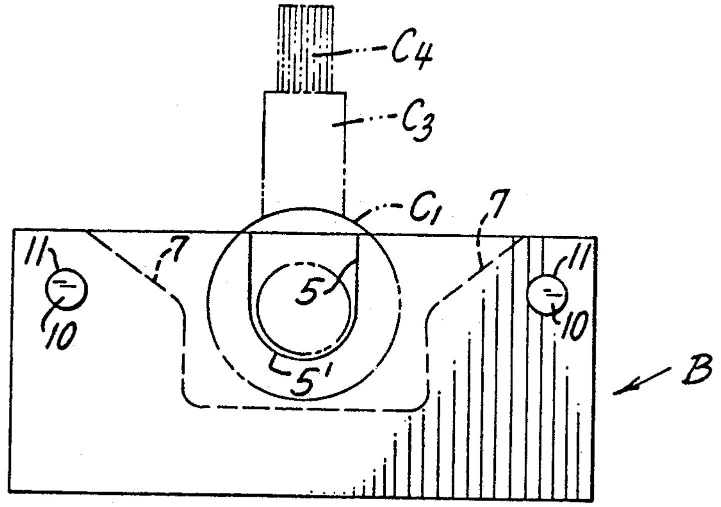
FIG. 2 is a view from below of the device in FIG. 1.

The device for removing the rail connector is designated in entirety in FIGS. 1-3 by reference character B and can be characterized generally as an extractor device B for removing connector C.

The device B comprises a generally rectangular block-like body 1 of rigid material having an extractor chamber 2 which is laterally open at one side of body 1. The open extractor chamber 2 has lower support edges 3 adapted for sitting under shoulder 4 of the body $C_1$ of the connector C as shown in FIG. 1. The pin $C_2$ of the connector C projects through a slot 5 formed in the bottom of the body 1. The cable connector $C_3$ of the connector C extends freely from the extractor as evident from FIG. 2. The extractor chamber 2 has flared side surfaces 7 which widen towards the open side of the extractor chamber and define an angle therebetween of about 75°. In use, the extractor device B is loosely seated on the connector C and is capable of being turned through the angle of 75° around the body $C_1$ by reason of the flared side surfaces 7. This permits the extractor device to be installed on a connector with substantial adjustment of position to avoid any ancillary equipment or installations.

The device B includes an activator portion 8 which comprises a head 9 having integral pins 10 which are slidably received in bores 11 in body 1. A bolt 12 is loosely rotatable in head 9 and is threadably engagable in body 1. For removal of the connector from rail R, head 9 is lowered on body 1 until the lower ends 13 of pins 10 seat against the web of the rail. Bolt 12 is then threadably advanted in body 1 until the bolt head contacts head 9 whereafter continued rotation of bolt 12 causes head 9 to pull up on body 1 producing a force at the shoulder 4 of the connector C to extract the connector C from the rail with an axial pulling force. The pins 10 located equal distances from the center of slot 5 so that the forces produced on the shoulder 4 of the connector C will be substantially equalized and thereby the connector will be pulled axially from the rail.

In order to minimize the size and mass of the extractor body, the flared side surface 7 are disposed in proximity to the bores 11 which receive the pins 10.

The axis of bolt 12 preferably passes through the center of body $C_1$ of the connector in order to avoid eccentricity and the development of moment forces on the connector and body 1. For the same purpose, it is preferred that the axis of bolt 12 is disposed in a common plane with the axes of pins 10. In order to position bolt 12 with respect to the connector C as set forth above, the slot 5 is formed with a curved end portion 5' against which the connector C is seated. The center of the curved end portion 5' is coaxial with the axis of bolt 12 and is disposed in a common plane with the axes of pins 10. Consequently, when the bolt 12 is turned and ends 13 of pins 10 bear against the web of the rail and support edge 3 of the body 1 bears against shoulder 4 of connector C, an axial extraction force is applied to the connector C at the shoulder 4 while a substantially equal and oppositely directed counter bearing force is applied to the web of the rail. The extraction force and counter bearing force can be substantially increased with relatively small rotation of the bolt 12 and with great mechanical advantage whereby connector C can be extracted with relatively little effort on the part of the workmen.

Figure 4A:
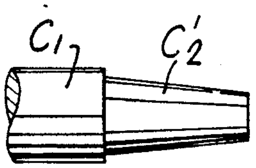
FIG. 4A is a side view of a portion of a modified connector according to the invention.

In order to facilitate the insertion and removal of the connector C from the rail, the connector $C_2$ is slightly tapered as shown at $C_2'$ in FIG. 4A instead of being cylindrical as shown at $C_2$ in FIG. 4 in the currently used connectors. Because the extractor device of the invention is relatively small and compact, it can be easily carried by a workman and transported from place to place where connectors are to be extracted.

Although the invention has been described in relation to a specific embodiment thereof, it will become evident to those skilled in the art that numerous modifications and variations can be made within the scope of the invention without departing from the appended claims.

What is claimed is:

1. A method of removing from a rail a connector having a projecting pin secured in the rail and connected to a body by a shoulder, said method comprising
   - positioning an extractor device adjacent to the web of a rail from which a connector is to be removed, the extractor device being disposed such that a body of the extractor device is horizontal and a receiving chamber in the body faces longitudinally of the rail and receives the body of the connector, the receiving chamber having a flared opening through which the body of the connector is guidably introduced into the chamber to center the body in the chamber while the projecting pin of the connector rides in a slot in the body of the extractor device until the projecting pin reaches the end of the slot and the shoulder of the connector bears on a supporting surface of the extractor device,
   - guidably supporting a pair of pins of an actuator in bores provided in the body of the extractor device such that when the body of the connector is received in the chamber, the pins face the wed of the rail,
   - moving the actuator relative to the body of the extractor device until the pins bear against the web of the rail and,
   - turning a bolt threaded into the extractor device and bearing against the actuator to apply an extractor force on said shoulder and a counterbearing force on the web by the pins such that the connector is pulled out of the rail.

2. A method as claimed in claim 1 wherein the extraction force and the counter bearing force are disposed in a common plane.

3. A method as claimed in claim 2 wherein the bolt travels along an axis also disposed in said plane.

4. A method as claimed in claim 1 wherein said body of the extractor device is turnable on the connector within an angular range permitted by said flared opening to enable the extractor device to be fitted in different positions on the connector depending on available space.

* * * * *